United States Patent [19]

Brownawell et al.

[11] 4,427,564

[45] Jan. 24, 1984

[54] ADDITIVE COMPOSITION FOR RELEASE OF STUCK DRILL PIPE

[75] Inventors: Darrell W. Brownawell, Scotch Plains; Antonio Gutierrez, Mercerville, both of N.J.; Patricia C. Matthews, Houston; Thad O. Walker, Humble, both of Tex.

[73] Assignee: Exxon Research & Engineering Co., Florham Park, N.J.

[21] Appl. No.: 428,825

[22] Filed: Sep. 30, 1982

[51] Int. Cl.³ .................. C09K 7/00; C09K 3/00; E21B 3/00
[52] U.S. Cl. .................. 252/8.55 R; 252/8.5 M; 252/8.5 P; 166/301
[58] Field of Search .............. 252/8.5 A, 8.5 C, 49.5, 252/56 R, 8.5 M, 8.55 B, 8.5 P, 8.55 R; 166/301

[56] References Cited

U.S. PATENT DOCUMENTS 4,123,373 10/1978 Brois .............................. 252/56 R X Primary Examiner—Herbert B. Guynn
Assistant Examiner—Catherine S. Kilby
Attorney, Agent, or Firm—Roland A. Dexter

[57] ABSTRACT

An additive composition effective in the release of stuck pipe in a borehole during a drilling operation which composition contains a propoxylated lactone acid, e.g. a $C_8$–$C_{22}$ alkyl lactone acids having from 10 to 13 propylene glycol units, an oil-soluble emulsifier-wetting agent and a liquid hydrocarbon diluent and for enhanced elevated temperature emulsion stability may include an imidazoline.

8 Claims, No Drawings

ADDITIVE COMPOSITION FOR RELEASE OF STUCK DRILL PIPE

FIELD OF THE INVENTION

This invention relates to new compositions useful in drilling operations wherein the drill string is stuck in the hole and cannot be readily released. More particularly, it relates to differential drilling operation problems involving stuck drill pipe and a chemical approach to overcoming said problems.

BACKGROUND OF THE INVENTION

The drilling of oil and gas wells by the rotary technique involves the circulation of a drilling fluid through the drill string, out the bit nozzles and its return to the surface via the annulus. This fluid cools and lubricates the drill string, develops sufficient hydrostatic head to counterbalance formation pressures and removes the cuttings from the borehole. This fluid also helps reduce the frictional forces between the drill string and the borehole or casing.

During the drilling operation, the drill string may become stuck and cannot be raised, lowered or rotated. There are a number of mechanisms possible which may contribute to this problem. Namely, these are (1) cuttings or slough build-up in the hole; (2) an undergage hole; (3) key-seating; and, (4) differential pressures.

Differential sticking may be defined as the sticking of the drill string against a permeable formation containing less pore fluid pressure than the hydrostatic pressure exerted by the drilling fluid column and usually occurs when the drill string remains motionless for a period of time. The mechanism by which this occurs involves the drill string coming into contact with the permeable zone, remaining quiescent for a period of time sufficient for mud cake to build up on each side of the point of contact, thus sealing the pipe against the borehole. The annular pressure exerted by the drilling fluid then holds the pipe against the borehole or the permeable zone.

Freeing of differentially stuck pipe is essentially a matter of reducing this pressure differential which exists across the pipe. One method used simply involves a reduction in fluid pressure by replacing the annular fluid with a less dense fluid allowing for less pressure differential to exist between the borehole and annulus. In some cases, the borehole pressure may exceed the annular pressure which in turn allows the pipe to be blown away from the borehole.

The most commonly used method to release stuck pipe is the spotting of an oil mud in the hole opposite the stuck interval. With time, the isolated area between the drill pipe and borehole is reduced by the oil mud. Too, oil invasion into the mud cake reduces the adhesive forces and lubricates the area between the pipe and borehole resulting in less friction and quicker release. More often than not, an extensive period of time is necessary for this to occur which results in an expensive loss of rig time.

In recent years, there have been a number of proprietary formulations developed aimed at releasing differentially stuck pipe, which formulations include: petroleum oil containing a material selected from the group consisting of 2-heptadecenyl-4-4-di-methoxy-2-oxazoline, 2-heptadecenyl-4-methoxy-4-methyl-2-oxazoline, the sodium salt of dioctyl sulfosuccinate, a mixture of a product containing high molecular weight free fatty acids, esters and alcohols made by acid cracking wool grease with about one-fourth its weight of the sodium salt of sulfated oleyl alcohol and mixtures thereof, in quantity sufficient to reduce interfacial tension at an interface between the petroleum oil and water to not more than 2 dynes per centimeter (U.S. Pat. 2,217,802); a surface-active agent prepared from about four parts of half ammonium half isopropylamine salt of the sulfosuccinic acid ester of the oleic acid amide of isopropanol amine and about one part of the isopropylamine salt of dodecyl benzene sulfonic acid which agent is added to the water base drilling fluid (U.S. Pat. No. 2,233,622); a polyethylene glycol having a molecular weight ranging from 106 to about 600 or a saturated salt water solution or a sea water solution of said glycol (U.S. Pat. No. 4,230,587); and, a water-in-oil emulsion obtained from an additive based on a mixture of $C_{18}$ to $C_{32}$ linear and branched alkanols propoxylated to contain from 20 to 25 moles of propylene oxide per mole of alkanol which can be readily formulated into a hydrocarbon diluent and with an emulsifier-wetting agent, e.g. a polyol ester of a $C_8$-$C_{22}$ fatty acid, and/or an imidazoline surfactant if desired (see U.S. Patent Application Ser. No. 369,577 filed Apr. 29, 1982 of common assignee).

There remains a need for alternative chemical compositions which can release stuck drill pipes, particularly those which have improved efficacy for releasing differentially stuck pipe.

SUMMARY OF THE INVENTION

It has been discovered that a propoxylated lactone e.g. a branched nonyl lactone tripropylene glycol ester prepared as the reaction product of one mole of a branched nonyl lactone acid and 12 moles of propylene oxide is a superior mud dehydrating agent which can be readily formulated with an emulsifier-wetting agent, e.g., a polyol ester of a $C_8$-$C_{22}$ fatty acid, and/or a complex imidazoline surfactant and a hydrocarbon diluent to provide a superior additive for freeing the stuck pipe by injecting a water-in-oil emulsion containing said formulation in the drilling fluid.

Therefore, in accordance with this invention, there is provided a stuck pipe additive composition comprising a lactone polyol ester represented by the formula

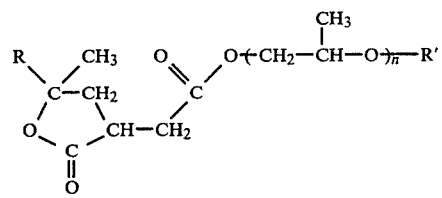

wherein R is selected from the group consisting of hydrogen, hydrocarbyl and substituted hydrocarbyl containing from 1 to 150 carbons, R' is selected from the group consisting of hydrogen and a lactone group represented by the formula

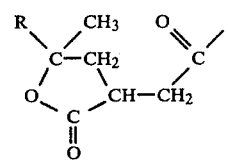

wherein R is as before and n is 3 to 40, preferably from 6 to 20 carbons; an oil-soluble emulsifier-wetting agent; and a hydrocarbon diluent. For improved high temperature stability complex an imidazoline emulsifier is added to said composition.

The invention provides an improved method of releasing a stuck drill string in the borehole of an underground formation during drilling operations employing a drilling fluid which comprises contacting said stuck drill string with an additive composition effective to reduce the annular pressure exerted by the drilling fluid against the stuck drill string and to release said stuck drill string, said additive composition being comprised of a lactone polyol ester represented by the formula

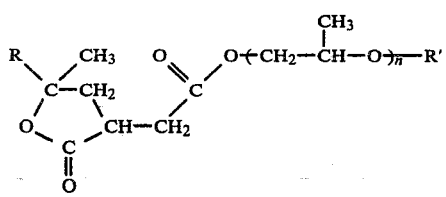

wherein R is selected from the group consisting of hydrogen, hydrocarbyl and substituted hydrocarbyl containing from 1 to 150 carbons, R' is selected from the group consisting of hydrogen and a lactone group represented by the formula

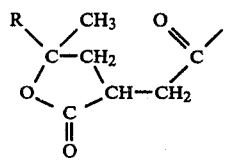

wherein R is as before and n is 3 to 40, optimally from 10 to 13; an oil-soluble $C_8$–$C_{22}$ fatty acid ester of polyol or polyol anhydride; and a liquid hydrocarbon diluent. Again, for high temperature stability an effective amount of imidazoline emulsifier is also present whereby above about 94° C. there is a reduction in tendency to water-wet the solids, e.g. barite.

DETAILED DESCRIPTION OF THE INVENTION

The lactone polyol ester usually alkyl and hydroxy alkyl lactone polyol esters constituting the mud dehydrating agent of the invention which has been found to possess a unique and surprising ability for mud dehydration under high pressure environments, represents a portion of the lactone polyol esters described in U.S. Pat. No. 4,123,373.

The lactone polyoleates described above as effective mud dehydrating agents which are particularly useful in stuck drill pipe compositions are dissolved in a small but at least an effective amount in a major proportion of a hydrocarbon diluent to provide useful additive compositions.

These hydrocarbon soluble compounds have at least 8 carbons in the substantially saturated aliphatic hydrocarbyl group and a carboxylic acid group of the dicarboxylic acid material converted into a lactone ring and another carboxylic acid group converted into a polyol ester as a result of the propoxylation of said hydrocarbon substituted dicarboxylic acid lactone material with from 3 to 30 moles of propylene oxide.

These lactone polyol esters of the present invention can be prepared as noted by propoxylation of said lactone acids by conventional techniques involving the catalytically induced propoxylation reaction, e.g. with NaOH, of propylene oxide and the alkyl lactone acid. The reaction is exothermic with the temperature usefully held at from 105°–150° C., e.g. at about 140° C.

Suitable polyols for preparing the oil-soluble emulsifier-wetting agents of the present invention are those polyhydric alcohols such as glycerol, diglycerol, and the sugar alcohols, which may be represented by the formula $CH_2OH(CHOH)_mCH_2OH$ where m is one to five as well as the polyol anhydrides thereof. Preferred are the esters of glycerol itself, $C_3H_5(OH)_3$, sorbitol and sorbitol anhydride (sorbitan). Esters based upon relatively higher, i.e., $C_{12}$–$C_{22}$, fatty acids or mixtures of fatty acids are more preferable, such as the tall oil fatty acids. The fatty acids may be saturated or unsaturated. Especially preferred are glycerol and sorbitan partial esters of liquid $C_{18}$–$C_{22}$ saturated fatty acids such as oleic, linoleic and palmitoleic fatty acids and mixtures of such acids. Optimally, the emulsifier-wetting agent is the sorbitan partial ester of oleic acid which ester is commercially available as Span 80 sold by ICI-Americas of Wilmington, Delaware.

The hydrocarbon diluent is present in the stuck pipe formulation to facilitate and/or make possible a water-in-oil emulsion by means of which the aforesaid formulation is introduced into the drilling fluid and thereby carried to the mud pack contiguous to the contact point. Preferred hydrocarbon diluents are mineral seal oil, diesel oil, paraffinic oil and white mineral oil.

The quantities of propoxylated alkyl lactone acid mud dehydrating agent, emulsifier-wetting agent and diluent which are used in the stuck pipe formulation are best expressed relative to the total amount of the formulation. Generally the stuck pipe additive compositions contain: from 5 to 25, preferably 8 to 18, weight percent propoxylated alkyl lactone acid mud dehydrating agent; from 4 to 20, preferably 5 to 15, weight percent emulsifier-wetting agent, and the balance hydrocarbon diluent.

The incorporation of a small but an effective amount of a supplementary emulsifier, usually a complex oil soluble imidazoline, improves the high temperature (above about 94° C.) emulsion stability and/or reduces the tendency to water-wet contained solids of the stuck drill pipe formulation of the invention. Oil soluble imidazolines such as the reaction product of a $C_{10}$–$C_{30}$ aliphatic or cycloaliphatic carboxylic acid, e.g. tall oil and an alkylene polyamine diethylene triamine as is generally taught in U.S. Pat. No. 3,416,900 are useful as supplemental emulsifiers when used in an amount ranging from 0.05 to 0.5, preferably 0.1 to 0.2, weight parts per part by weight of propoxylated $C_{18}$–$C_{32}$ alkanols.

Thus the imidazoline can be characterized as a heterocylic compound including the structural moiety of

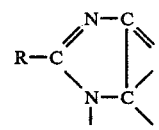

wherein R is an alkyl or cycloalkyl group having from 10 to 30 carbons.

Particularly preferred is a stuck pipe formulation of 17 weight percent propoxylated C₁₀ isoalkyl lactone acid mud dehydrating agent 13 weight percent sorbitan partial ester of oleic acid and the balance a paraffinic oil diluent such as Mentor 28 oil sold by Exxon Chemical Co., Houston, Texas.

The composition is readily prepared by simply admixing all these components as by stirring at ambient temperatures.

A water-in-oil emulsion is prepared using the preferred stuck pipe formulation of the invention and fresh water. The desired quantity of stuck pipe formulation is placed in a container. To this is slowly added with vigorous stirring the desired amount of water. After addition of the water, the liquid is stirred for an additional 0.5 hours. This procedure produces a milky viscous water-in-oil emulsion which can contain from 10 to 55 volume percent of fresh water.

The emulsion so prepared is used as the spotting fluid. A given quantity, usually 50 to 100 bbl. of the spotting fluid is pumped from a slugging pit down the drill pipe through the bit, into the annulus and is spotted adjacent to the point considered to be differentially stuck. The spotting fluid is allowed to soak for a given time, e.g. from 8 to 12 hours. During this soaking process 2 to 3 bbl. of fluid may be pumped from the drill pipe each hour to assure maximum benefit from the spotting fluid by introducing fresh spotting fluid to the region contiguous with the contact point.

Under some circumstances, it is desirable to admix from 40 to 70, preferably 57, weight percent of the propoxylated alkyl lactone acid represented by the formula:

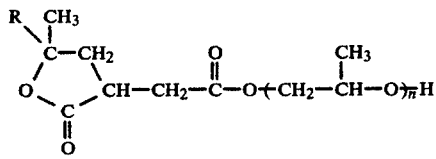

wherein R represents an alkyl or hydroxy alkyl group of from 1 to 150, preferably 8 to 22, carbon atoms and n is an integer of from 3 to 40; with from 60 to 30, preferably 43, weight percent of said emulsifier-wetting agent into a package which can subsequently be blended with said liquid hydrocarbon diluent at a remote location, e.g., at a facility adjacent to the location at which said additive composition is to be utilized.

The invention will be further understood by reference to the following Examples which illustrate a preferred form of the invention and compare the same with commercially available stuck pipe formulations.

EXAMPLE 1

Preparation of diisobutenyl lactone polypropylene glycol diester believed to have the formula

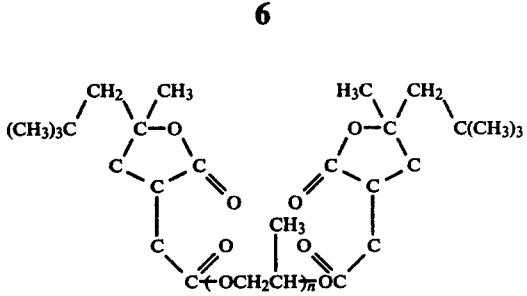

where n is 7.3, was accomplished by reacting 91.2 g (0.4 mole) of Dibsalac (lactone acid derived from diisobutenyl succinic anhydride as described in U.S. Pat. No. 4,221,720 example 1) and 85 g (0.2 mole) of polypropylene glycol of average molecular weight of 425 combined in 200 ml of xylene and a pinch of p-toluene sulfonic acid. The reaction mixture was heated to the azeotroping temperature (140°–150° C.) until the cessation of the water of reaction. After 3 hours, the infrared analysis indicated virtually complete conversion of lactone ester. The xylene was stripped with nitrogen at 150° C. and the residue featured an infrared spectrum with intense lactone and ester carbonyl adsorption bands at 5.63 and 5.80 microns.

EXAMPLE 2

Preparation of diisobutenyl lactone polypropylene glycol ester believed to have the formula

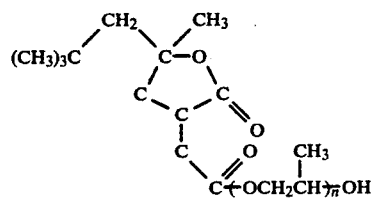

wherein n is about 7.3, was accomplished by reacting 45.6 g (0.2 mole) of Dibsalac, 85 g (0.2 mole) of polypropylene glycol of average molecular weight of 425, and 0.1 g of para-toluene sulfonic acid charged into a reaction flask and combined with 200 ml of xylene. The reaction mixture was then refluxed at 140°–150° C. to azeotrope the water of reaction for about 4 hours. Heating was continued until cessation of water and completion of the reaction as indicated by infrared spectroscopy. The xylene was rotoevaporated under high vacuum constant weight. An oily residue was obtained which solidified upon standing at room temperature. The solvent-free product featured an infrared spectrum with intense lactone and ester carbonyl absorption bands at 5.63 and 5.80 microns.

EXAMPLE 3

Preparation of tetrapropenyl lactone polypropylene glycol diester believed to have the formula

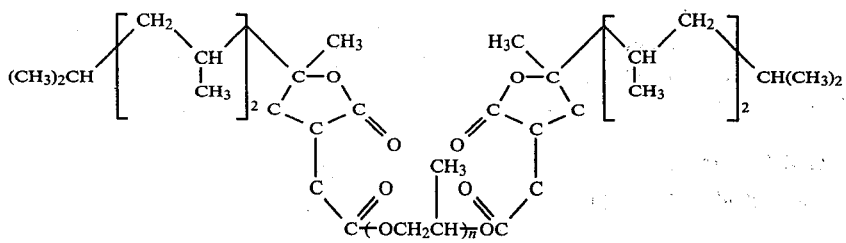

wherein n is 7.3, was accomplished by first dissolving 113.5 g (0.4 mole) of Tpsalac (lactone acid derived from tetrapropenyl succinic anhydride as described in Example 3 of U.S. Pat. No. 4,221,720) in 200 ml of xylene and charged into a reaction flask. While stirring at room temperature 85.0 g (0.2 mole) of polypropylene glycol of average molecular weight of 425, and 0.1 g of p-toluene sulfonic acid were added. The reaction mixture was then heated to 140°–150° C. to azeotrope the water of reaction. The heating was continued until the cessation of water and maximum lactone-ester absorption bands as indicated by IR. The reaction was virtually complete in about 2 hours. The xylene was rotoevaporated under high vacuum at 100° C. for 2 hours. The oily residue solidified upon standing at room temperature. The infrared spectrum of the solvent-free material showed prominent lactone and ester carbonyl absorption bands at 5.63 and 5.80 microns.

EXAMPLE 4

Preparation of tetrapropenyl lactone polypropylene glycol ester believed to have the formula

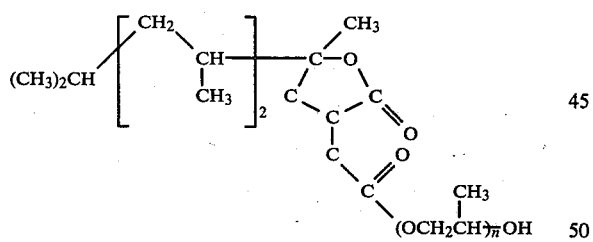

wherein n is about 7.3, was accomplished by reacting 68.2 g (0.24 mole) of Tpsalac, 102 g (0.2 mole) of polypropylene glycol of average molecular weight of 425, in 200 ml of xylene and 0.1 g of p-toluene sulfonic acid. The reaction mixture was then heated to 140°–150° C. to azeotrope the water of reaction for about 3–4 hours. Infrared analysis showed virtually complete conversion to lactone ester. The xylene was rotoevaporated at 100° C. and an oily residue which solidified upon standing at room temperatures was obtained. The infrared of the crude material showed an infrared spectrum with intense lactone and ester carbonyl absorption bands at 5.63 and 5.80 microns.

EXAMPLE 5

Preparation of tetrapropenyl lactone polypropylene glycol ester believed to have the formula

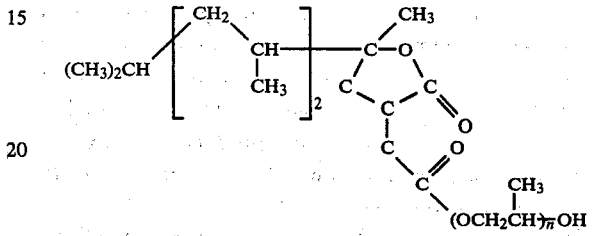

wherein n is about 34.5, was accomplished by dissolving a tenth of a mole (28.4 g) of Tpsalac in 200 ml of xylene and charging into a reaction flask. The xylene solution was stirred at room temperature and 0.1 mole (200 g) of a polypropylene glycol of average molecular weight of 2000 and 0.1 g of p-toluene sulfonic acid were added. The reaction mixture was heated to about 140°–150° C. to azeotrope the water of reaction for about 3–4 hours. Infrared analysis showed virtually completion to lactone ester. The xylene was rotoevaporated at 100° C. and an oily residue was obtained. A waxy solid was obtained upon cooling at room temperature. The infrared spectrum of the crude material feature intense lactone and ester carbonyl absorption bands at 5.63 and 5.80 microns.

EXAMPLE 6

Preparation of polyisobutenyl lactone polypropylene glycol ester believed to have the formula

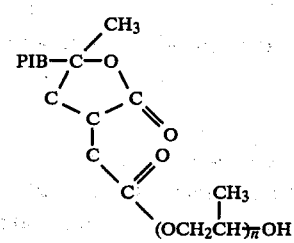

wherein n is about 7.3 and PIB refers to a polyisobutenyl substituent having a $\overline{M}n$ of 960 and composed of a mixture of hydrocarbon chains predominantly 75 to 105 carbons was accomplished by charging 0.1 mole of Pibsalac (derived from polyisobutenyl succinic anhydride preferred as described in Example 6 of U.S. Pat. No. 4,221,720) into a reaction flask and diluting with 200 ml of xylene. About 0.1 mole (42.5 g) of polypropylene glycol of average molecular weight of 425 and 0.1 g of p-toluene sulfonic acid were added to the reaction flask and then heated to azeotrope the water of reaction until complete conversion to lactone ester was observed by IR. The xylene was rotoevaporated and the residue was diluted in an equal weight of neutral oil solvent 150 neutral. IR analysis of the oil solution showed strong absorption bands at 5.63 and 5.80 microns ascribable to the lactone and ester carbonyl functionalities.

EXAMPLES 7–28

Additional products of the invention were produced according to the process of Example 5 by reacting an alkyl lactone acid of the structure

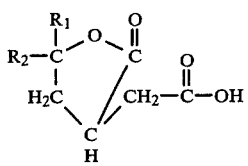

in which $R_1$ and $R_2$ are defined in Table 1 and polypropylene glycol of the indicate Mn to produce the novel glycol products, i.e. lactone monoesters, illustrated by the structure formula

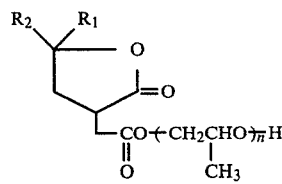

TABLE I

| Examples | $R_1$ | $R_2$ | Polypropylene Glycol Mw | n |
|---|---|---|---|---|
| 7 | $CH_3$ | $CH_3$ | 425 | 7.3 |
| 8 | $C(CH_3)_2CH_2$— | $CH_3$ | 425 | 7.3 |
| 9 | $C_6H_{13}$— | H | 425 | 7.3 |
| 10 | $C_{15}H_{31}$— | H | 425 | 7.3 |
| 11 | PIB | H | 425 | 7.3 |
| 12 | $(CH_3)_2CH$—[$CH_2$—$CH(CH_3)$]$_2$ | $CH_3$ | 725 | 12 |
| 13 | " | $CH_3$ | 1,000 | 17 |
| 14 | " | $CH_3$ | 2,000 | 34 |
| 15 | $CH_2OH$ | $CH_3$ | 425 | 7.3 |
| 16 | $CH_2OH$ | $(CH_3)_3C$—$CH_2$ | 425 | 7.3 |

Then using the procedure of Example 1 additional products were produced where the glycol is linked to 2 alkyl lactone acid moieties to produce the bis-lactone ester as pictured in the following structure with the results tabulated (as in Table I) in Table II.

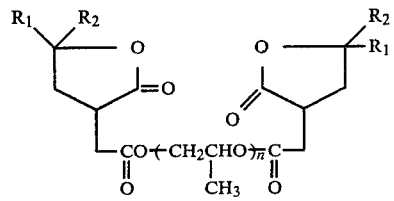

TABLE II

| Examples | $R_1$ | $R_2$ | Polypropylene Glycol Mw | n |
|---|---|---|---|---|
| 17 | $CH_3$ | $CH_3$ | 425 | 7.3 |
| 18 | $C(CH_3)_2CH_2$— | $CH_3$ | 425 | 7.3 |
| 19 | $C_6H_{13}$— | H | 425 | 7.3 |
| 20 | $C_{15}H_{31}$— | H | 425 | 7.3 |
| 21 | PIB | H | 425 | 7.3 |
| 22 | $(CH_3)_2CH$—[$CH_2$—$CH(CH_3)$]$_2$ | | | |
| 23 | " | $CH_3$ | 725 | 12 |
| 24 | " | $CH_3$ | 1,000 | 17 |
| 25 | " | $CH_3$ | 2,000 | 34 |
| 26 | $CH_2OH$ | $CH_3$ | 425 | 7.3 |
| 27 | $CH_2OH$ | $(CH_3)_3C$—$CH_2$ | 425 | 7.3 |
| 28 | $CH_2OH$ | $(CH_3)_2CH$—[$CH_2$—$CH(CH_3)$]$_2$ | 425 | 7.3 |

PIB represents polyisobutylene of about 900 Mw

All of the products produced are at room temperature brown and oil.

EXAMPLE 29

The propoxylated $C_{10}$ isoalkyl lactone acid of Example 12 is used as the primary ingredient for the preparation of a stuck pipe additive formulation. It is known that to have a good stuck pipe additive, one must have a system that is very oily. Therefore, in addition to the propoxylated lactone acid ester sorbitan monooleate ester was added as the emulsifier-wetting agent. This material is known to be a very good molecule for rendering a surface oil wet.

A formulation consisting of 17% by weight of said $C_{10}$ alkyl lactone acid propoxylate, 13% by weight of sorbitan monooleate and the balance paraffinic oil provided a good system for emulsification with an equal volume of water to produce a water-in-oil emulsion (Test Formulation #30-12) which is added to the drilling mud such as a sea water lignosulfonate mud weighted with borite.

EXAMPLE 30

The $C_{10}$ alkyl lactone polypropylene glycol monoesters of Examples 4, 12 and 13 were each evaluated for stuck drill pipe activity using the Amoco Sticking Force Test. Each was formulated as in Example 29 to provide the respective water-in-oil emulsion.

In the Amoco Sticking Force Test procedure, a filter cake of mud is allowed to form under controlled conditions. A small disc is placed on top of the filter cake and additional filter cake is deposited on and around the disc until it becomes stuck. The force required to "unstick" or remove the disc is determined to provide the control value. The procedure is repeated until the disc becomes stuck after which a stuck pipe formulation to be tested is poured on top of the filter cake and allowed to soak for a given time. The force required to remove the disc is then determined. The force (in Kg) required to remove the disc from a cake "unsoaked" minus the force (in Kg) necessary to remove the disc from a soaked cake divided by the force required to remove the disc from an unsoaked cake is reported as the % reduction.

The following data of Table III was reported to us by an independent testing laboratory showing the comparative performance of these 3 aforementioned stuck pipe formulations.

TABLE III

| Example | Added Stuck Pipe Formulation Emulsion Containing Lactone Ester of Example | % Reduction In Sticking Force |
|---|---|---|
| 30-4 | 4 | +1.5 |
| 30-12 | 12 | +37.6 |
| 30-13 | 13 | +19.5 |

The invention in its broader aspect is not limited to the specific details shown and described and departures may be made from such details without departing from the principles of the invention and without sacrificing its chief advantages.

We claim:

1. An improved method of releasing a stuck drill string in the borehole of an underground formation during drilling operations employing a drilling fluid which comprises contacting said stuck drill string with an additive composition effective to reduce the annular pressure exerted by the drilling fluid against the stuck drill string and to release said stuck drill string, said additive composition being comprised of 5 to 25 weight percent of a propoxylated $C_1$-$C_{150}$ lactone acid represented by the formula:

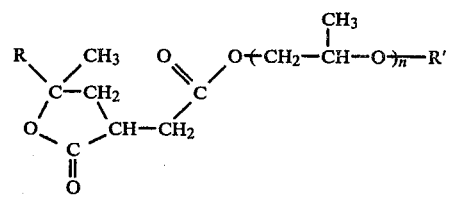

wherein R is selected from the group consisting of hydrogen and hydrocarbyl containing from 1 to 150 carbons, R' is selected from hydrogen or

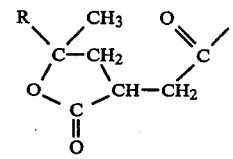

and n is an integer of from 3 to 40; from 4 to 20 weight percent a $C_8$-$C_{22}$ fatty acid ester of a polyol or polyol anhydride; and, a liquid hydrocarbon diluent.

2. The method of claim 1 wherein said propoxylated $C_1$-$C_{150}$ lactone acid is the polypropylene glycol ester of a $C_{10}$ isoalkyl lactone acid resulting from the reaction of from 10 to 13 moles of propylene glycol with one mole of acid.

3. The method according to claim 1 wherein said hydrocarbon diluent is a member of the class consisting of mineral seal oil, diesel oil, paraffinic oil and white mineral oil.

4. The method according to claim 1 wherein said composition is a water-in-oil emulsion with said water being from about 10 to about 50 percent by weight of said emulsion.

5. A stuck drill pipe additive composition comprising from 5 to 25 weight percent of a propoxylated lactone acid represented by the formula:

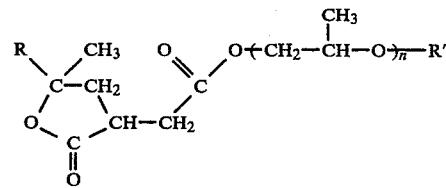

wherein R is selected from the group consisting of hydrogen and hydrocarbyl containing from 1 to 150 carbons, R' is selected from hydrogen or

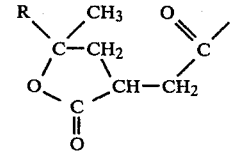

and n is an integer of from 3 to 40; from 4 to 20 weight percent an oil-soluble emulsifier-wetting agent; and, a hydrocarbon diluent.

6. A stuck pipe additive composition according to claim 5 also having from 0.05 to 0.5 weight parts of imidazoline supplemental emulsifier per weight part of said propoxylated lactone acid.

7. A stuck pipe additive composition according to claim 4 wherein in the lactone acid formula R is a $C_{10}$ isoalkyl group, R' is hydrogen and n is from 10 to 13.

8. A method of releasing a stuck drill string according to claim 1 wherein said additive composition also includes an imidazoline emulsifier.

* * * * *